(12) United States Patent
Hasegawa

(10) Patent No.: US 7,357,517 B2
(45) Date of Patent: Apr. 15, 2008

(54) PROJECTOR, METHOD OF CONTROLLING THE PROJECTOR, PROGRAM FOR CONTROLLING THE PROJECTOR, AND RECORDING MEDIUM STORING THE PROGRAM

(75) Inventor: Hiroshi Hasegawa, Chino (JP)

(73) Assignee: Seiko Epson Corporation, Tokyo (JP)

( * ) Notice: Subject to any disclaimer, the term of this patent is extended or adjusted under 35 U.S.C. 154(b) by 171 days.

(21) Appl. No.: 11/344,190

(22) Filed: Feb. 1, 2006

(65) Prior Publication Data

US 2006/0181685 A1 Aug. 17, 2006

(30) Foreign Application Priority Data

Feb. 16, 2005 (JP) ............................. 2005-038732

(51) Int. Cl.
*G03B 21/26* (2006.01)
*H04N 3/22* (2006.01)
*H04N 3/26* (2006.01)
*H04N 3/223* (2006.01)
*H04N 3/227* (2006.01)

(52) U.S. Cl. .................. 353/94; 353/69; 353/122; 348/745; 348/747; 345/1.3; 345/77

(58) Field of Classification Search ................ 353/94, 353/69, 70, 122; 348/745–747; 345/1.1, 345/1.3, 2.2, 77, 647, 660, 665
See application file for complete search history.

(56) References Cited

U.S. PATENT DOCUMENTS 6,834,965 B2 * 12/2004 Raskar et al. .................. 353/94

FOREIGN PATENT DOCUMENTS

| JP | A 2001-051346 | 2/2001 |
| JP | A 2004-032665 | 1/2004 |

* cited by examiner

*Primary Examiner*—Rochelle Blackman
(74) *Attorney, Agent, or Firm*—Oliff & Berridge, PLC

(57) ABSTRACT

A projector includes an image capture device that captures an image in a capture region larger than a projection region of a projection image; an image determining unit that compares and determines the projection image projected by the corresponding projector with another projection image projected in the capture region on the basis of capture information acquired from the image capture device; a transmission image display unit that projects and displays a transmission image indicating that the corresponding projector is ready to perform a tiling projection when the image determining unit determines that the projection image projected by the corresponding projector is the same as the another projection image; a transmission image determining unit that determines whether or not another projector projecting the another projection image has projected the transmission image; and a process parameter creating unit that creates a process parameter which processes display information of the projection image on the basis of a determination result of the transmission image determining unit.

7 Claims, 17 Drawing Sheets

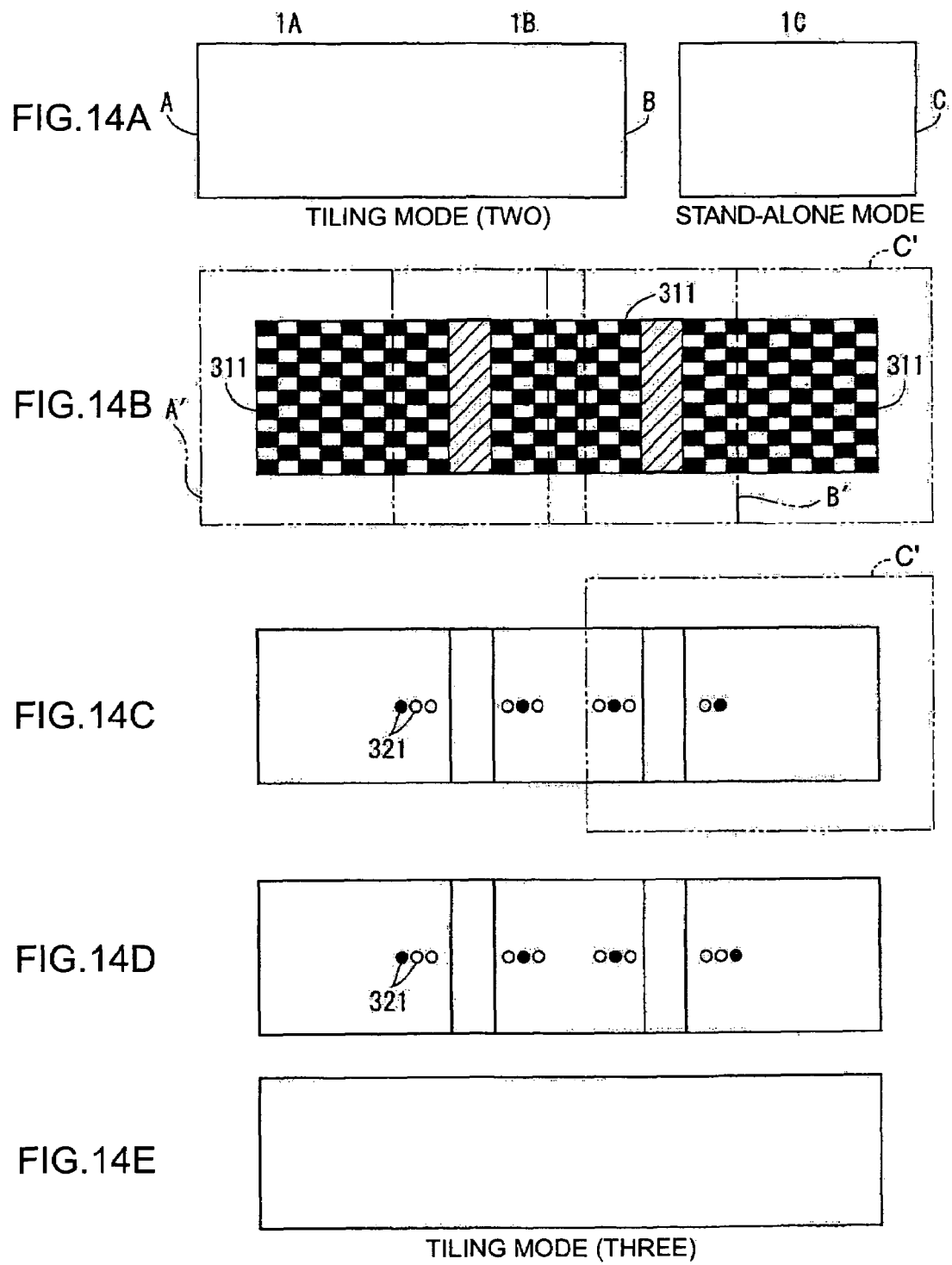

TILING MODE (THREE)

TILING MODE (TWO)

TILING MODE (TWO)

STAND-ALONE MODE

PROJECTOR, METHOD OF CONTROLLING THE PROJECTOR, PROGRAM FOR CONTROLLING THE PROJECTOR, AND RECORDING MEDIUM STORING THE PROGRAM

BACKGROUND

1. Technical Field

The present invention is related to a projector, a method of controlling the projector, a program for controlling the projector, and a recording medium storing the program.

2. Related Art

A projection type projector can easily arrange or overlap images (still images or motion pictures) on a screen, as compared with a display device, such as a CRT display or a liquid crystal display called as a direct-view-type display. In other words, it is possible to obtain large and high-definition projection images by projecting images output from a plurality of projectors on the screen so as to be parallel to one another (called as tiling projection or division projection: refer to JP-A-2001-51346 and JP-A-2004-32665), and it is also possible to obtain even brighter projection images by projecting the images on the screen so as to overlap one another (called as stacking or overlapping projection).

In recent years, as a research of the tiling projection or the stacking projection, it has been tested that a plurality of projectors are disposed in proper places, a projection region of an image projected from each of the projectors is captured by using an image capturing device such as a camera, a maximum-sized rectangular region included in the projection region is determined, and a divided projection image is automatically and precisely projected on the projection region.

However, in order to perform the tiling projection or the stacking projection, an additional control device is needed so as to control an image to be transmitted to a projector or control the projection position on the basis of the capturing result of entire projection images. Accordingly, there has been a problem in that an overall system of a projector becomes bigger and it is not convenient to be used.

SUMMARY

An advantage of some aspects of the invention is that it provides a projector in which an entire system does not become bigger and can be easily used when, in particular, a tiling projection is performed, a method of controlling the projector, a program for controlling the program, and a recording medium storing the program.

According to an aspect of the invention, a projector includes: an image capture device that captures an image in a capture region larger than a projection region of a projection image; an image determining unit that compares and determines the projection image projected by the corresponding projector with another projection image projected in the capture region on the basis of capture information acquired from the image capture device; a transmission image display unit that projects and displays a transmission image indicating that the corresponding projector is ready to perform a tiling projection when the image determining unit determines that the projection image projected by the corresponding projector is the same as the another projection image; a transmission image determining unit that determines whether or not another projector projecting the another projection image has projected the transmission image; and a process parameter creating unit that creates a process parameter which processes display information of the projection image on the basis of a determination result of the transmission image determining unit.

According to the invention, when the transmission image determining unit determines that the another projection image is the same as the projection image projected by the corresponding projector, the transmission image indicating that the corresponding projector is capable of performing the tiling projection is displayed. On the other hand, if the another projector has the same function, the transmission image indicating that the corresponding projector is capable of performing the tiling projection will be displayed. Each of the projectors can recognize that each of the projectors can perform the tiling projection by capturing the transmission images. Accordingly, the both projectors can perform the tiling projection by processing the display information of the image to be projected in the corresponding projector for the tiling projection and projecting the display information. Since the projector can determine that the other party is ready to perform the tiling projection by using the transmission image projected by the other party, a user can conveniently perform the tiling projection without transmitting information by using a conventional large-sized dedicated control unit.

In the projector, preferably, the transmission image indicates a coordinate system of the corresponding projector.

In the tiling projection, parts of the projection images overlap each other. However, in the invention, since the transmission image indicates the coordinate system, the projector can determine the size or the position of the overlap region and exactly specify pixels which form the image in the overlap region. Accordingly, the projector can precisely control the brightness of the overlap region so as to remove the non-uniformity between the overlap region and a non-overlap region when performing the tiling projection by processing the display information of the image to be projected based on the determined size or position of the overlap region.

In the projector, preferably, the transmission image indicates whether or not there is any other adjacent projector.

According to the invention, when performing the tiling projection by adding another projector to the corresponding projector performing the projection, the corresponding projector displays the transmission image indicating two projectors obtained by adding the newly arranged projector to the corresponding projector. Accordingly, the newly added projector captures the transmission image displayed by the corresponding projector so that the newly added projector can determine that two projectors are performing the tiling projection and can precisely create the process parameter when performing the tiling projection with two projectors.

In addition, when performing the tiling projection by further adding one projector to two projectors performing the tiling projection so as to perform bigger tiling projection, the corresponding projector (to which a new projector will be added) performing the tiling projection can display the transmission image which indicates three projectors by adding the newly arranged projector to the corresponding projector and the adjacent projector. Accordingly, the newly added projector captures the transmission image being displayed by the corresponding projector so that the newly added projector can determine that three projectors are performing the tiling projection not two projectors and can precisely create the process parameter in a case of performing the tiling projection with three projectors.

In the projector, preferably, the transmission image indicates the total number of projectors provided for the tiling projection and indicates the position of the corresponding projector among all of the projectors.

According to the invention, even in a case of performing the tiling projection by using a plurality of projectors, the projector can accurately create the process parameter of the display information, and as a result, it is possible to provide a general-purpose projector.

Further, in the projector, preferably, the projector further includes an overlap region determining unit that compares the brightness of the projection image, of the corresponding projector, corresponding to an overlap region overlapping the projection image of the another projector and the brightness of the projection image corresponding to a non-overlap regions.

According to the invention, if the projector determines that the brightness of the overlap region becomes darker, for example, in a predetermined gradation along an external side by comparing the overlap region with the non-overlap region in the projection image projected by the corresponding projector, the projector determines that the another projector of the other party performing the tiling projection is excluded, so that it is possible to prepare for a case in which the number of projectors provided in the tiling projection is increased.

According to another aspect of the invention, a method of controlling a projector includes: capturing an image in a capture region larger than a projection region of a projection image; comparing and determining the projection image projected by the corresponding projector with another projection image projected in the capture region on the basis of capture information acquired from an image capture device; projecting and displaying a transmission image indicating that the corresponding projector is ready to perform a tiling projection when it is determined that the projection image projected by the corresponding projector is the same as the another projection image; determining whether or not another projector projecting the another projection image has projected the transmission image; and creating a process parameter which processes display information of the projection image on the basis of a determination result.

Further, according to still another aspect of the invention, a program for controlling a projector having an image capture device capturing an image in a capture region larger than a projection region of a projection image allows a computer to function as: an image determining unit that compares and determines the projection image projected by the corresponding projector with another projection image projected in the capture region on the basis of capture information acquired from the image capture device; a transmission image display unit that projects and displays a transmission image indicating that the corresponding projector is ready to perform a tiling projection when the image determining unit determines that the projection image projected by the corresponding projector is the same as the another projection image; a transmission image determining unit that determines whether or not another projector projecting the another projection image has projected the transmission image; and a process parameter creating unit that creates a process parameter which processes display information of the projection image on the basis of a determination result of the transmission image determining unit.

Furthermore, according to still another aspect of the invention, a recording medium storing the program for controlling the projector is provided.

The recording medium may be a RAM (random access memory), a ROM (read only memory), a CD (compact disc)-ROM, an FD (flexible disc: registered trademark), an MO (magneto optical), an HD (hard disk), or a USB (universal serial bus) memory.

The above-described effect can be achieved by applying, to the projector of the invention, the method of controlling the projector, the program for controlling the projector, and the recording medium storing the program.

BRIEF DESCRIPTION OF THE DRAWINGS

The invention will be described with reference to the accompanying drawings, wherein like numbers reference like elements.

FIGS. 14A to 14E are views showing a projection image when the tiling mode with two projectors is changed to the tiling mode with three projectors.

DESCRIPTION OF EXEMPLARY EMBODIMENTS

Hereinafter, embodiments according to the invention will be described with reference to the accompanying drawings.

Figure 1:
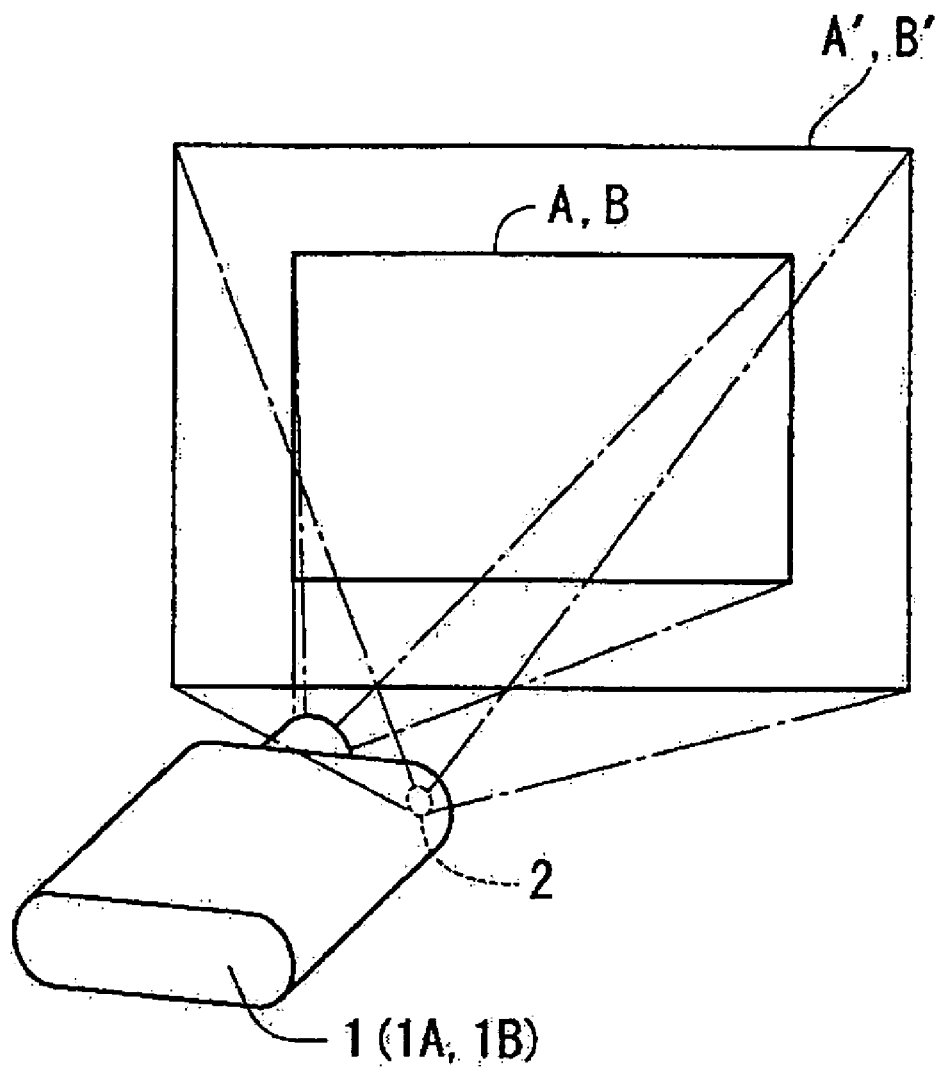
FIG. 1 is a view schematically showing a projector according to an embodiment of the invention.
Figure 2:
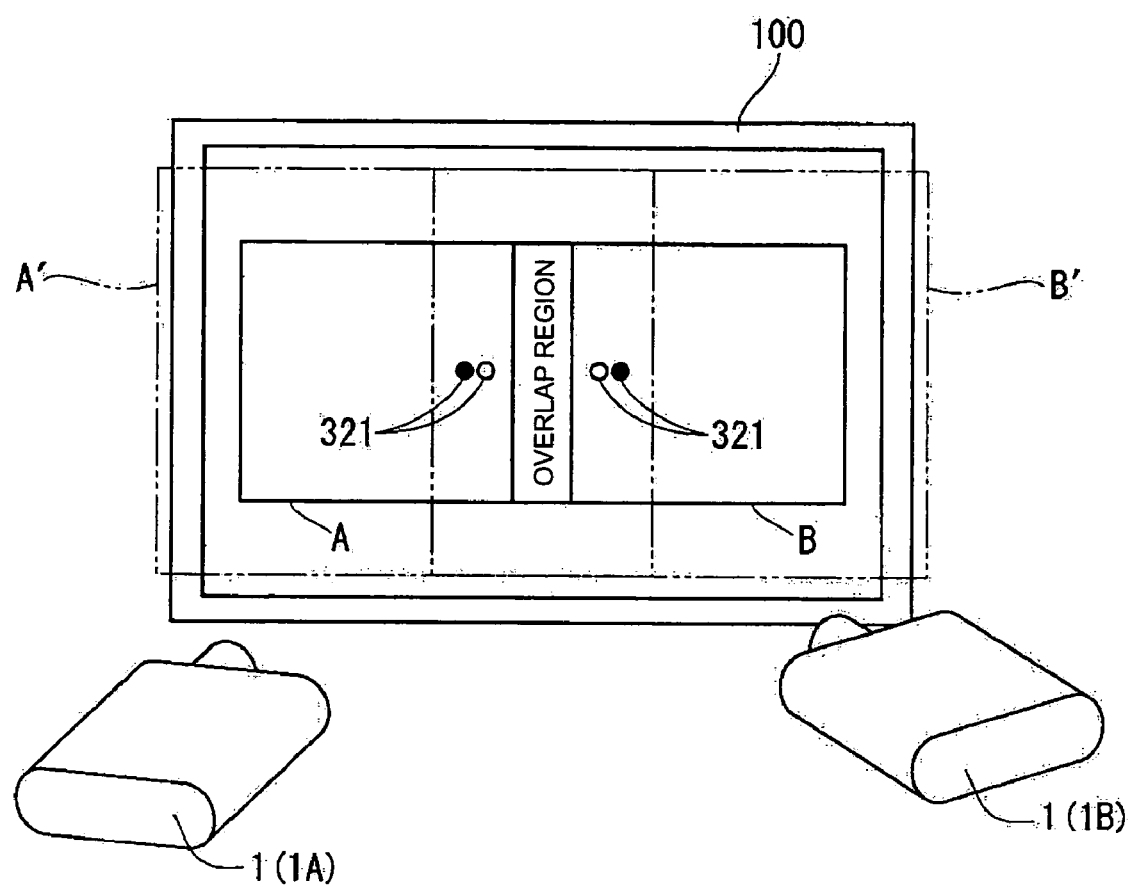
FIG. 2 is a view schematically showing a process for performing a tiling projection by using a plurality of projectors.

FIG. 1 is a view showing a projector 1 (1A and 1B) according to one embodiment of the invention. FIG. 2 is a view showing a process for performing a tiling projection by using a plurality of projectors 1 (two in FIG. 2).

Summary of Projector

As shown in FIGS. 1 and 2, the positions of the two projectors 1A and 1B are determined such that the projectors 1A and 1B can perform tiling projections in precise positions of projection regions A and B, having approximately the same size, on a screen 100. Each of the projectors 1A and 1B includes an image capturing device 2 capable of capturing capture regions A' and B' larger than the projection regions A and B. In addition, the size of the screen 100 may be determined according to the number of projectors 1, that is, the size of the tiling projection. Accordingly, a larger screen 100 may be used in a case of performing the tiling projection with the plurality of projectors 1.

In this embodiment, the projectors 1A and 1B may have a stand-alone mode and a tiling mode for image projection. In the stand-alone mode, display information received from an AV device such as DVD or the like or a PC is inputted to project the image to each of the projectors 1A and 1B. In the tiling mode, one image is tiling-projected in a large projection region in which the projection regions A and B are combined. Accordingly, in the tiling mode, the display information inputted to each of the projectors 1A and 1B are the same and synchronized with each other. However, since the projectors 1A and 1B need to project only the image corresponding to the projection regions A and B, each of the projectors 1A and 1B performs an individual process for the inputted image information inside.

As one of the most discriminative functions of the projector 1, if other projector 1 which is to perform the tiling projection is added when the corresponding projector 1 performs the projection in the stand-alone mode, the projector 1 automatically determines the added other projector 1 and changes the projection mode from the stand-alone mode to the tiling mode so as to perform the tiling projection. On the other hand, when one of the projectors 1 is separated in order to perform the projection in the stand-alone mode (or the projection is stopped) during the projection in the tiling mode, the projector 1 automatically determines the separation of the projectors and changes the tiling mode to the stand-alone mode. In addition, when continuing the tiling projection while increasing or decreasing the number of projectors during the projection in the tiling mode, it is possible to perform the tiling projection corresponding to the number of increased decreased projectors. Further, the change of the projection type corresponding to the increase or decrease of the number of projectors is realized without a dedicated control device according to the related art.

Configuration of Projector

Figure 3:
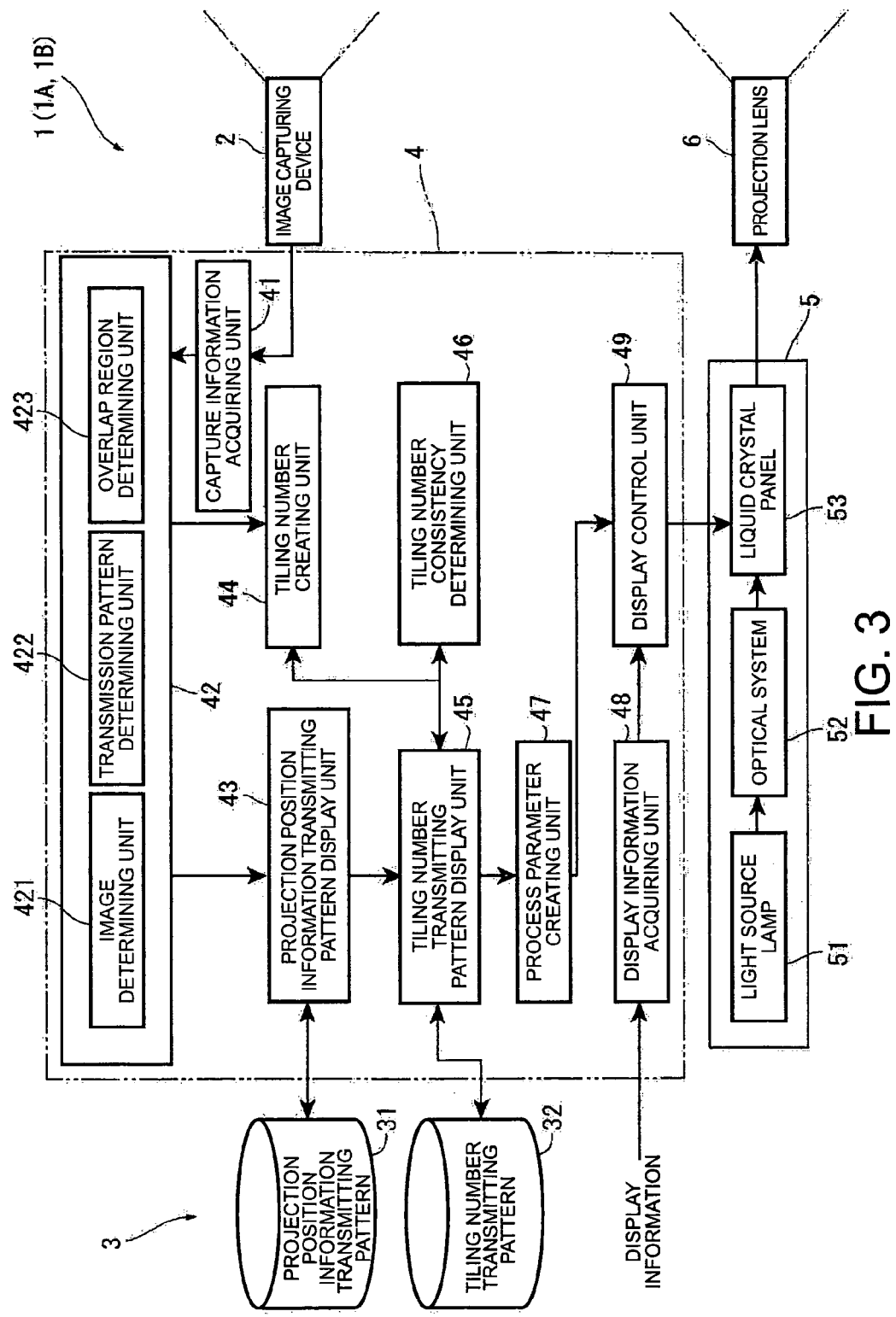
FIG. 3 is a block diagram showing main parts of the projector.

The configuration for realizing the above-described functions will be described with reference to FIG. 3. FIG. 3 is a block diagram showing main parts of the projector 1.

In FIG. 3, the projector 1 is a liquid crystal projector using a liquid crystal light valve as a light modulation element. The projector 1 includes an above-described image capturing device 2, a storage unit 3 composed of RAM or ROM, a control unit 4 constructed by a computer technology, an optical unit 5, and a projection lens 6.

The image capturing device 2 includes an image capturing device, such as a CCD or CMOS, and can continuously capture the capturing regions A' and B' during the projection in the stand-alone mode and the tiling mode. The capture information captured by the image capturing device 2 is output to the control unit 4

Figure 4:
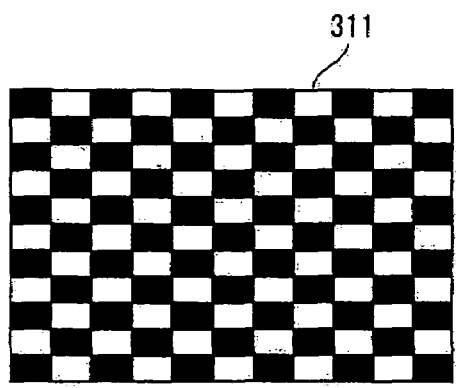
FIG. 4 is a view showing a projection position information transmitting pattern.
Figure 5:
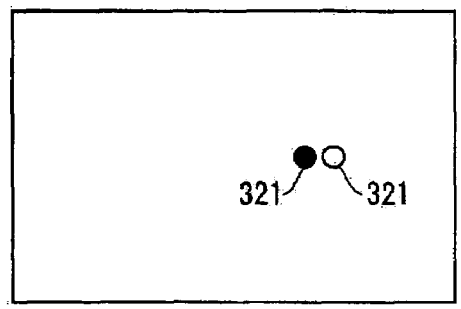
FIG. 5 is a view showing a tiling number transmitting pattern.
Figure 6:
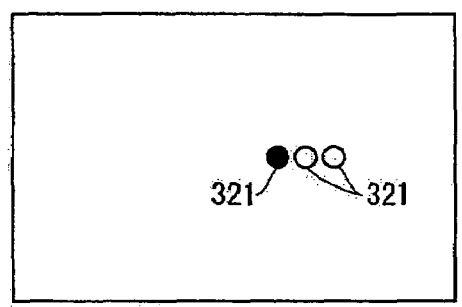
FIG. 6 is a view showing another tiling number transmitting pattern.

The storage unit 3 includes a projection position information transmitting pattern storage unit 31 which stores checkered projection position information transmitting patterns (transmission images) 311 as shown in FIG. 4 and a tiling number transmitting pattern storage unit 32 which stores tiling number transmitting patterns (transmission images) 321 as shown in FIGS. 5 and 6.

The projection position information transmitting patterns 311 and the tiling number transmitting patterns 321 are projected onto the screen 100 at a desired timing while changing the projection type. Accordingly, the projection position information transmitting patterns 311 and the tiling number transmitting patterns 321 are automatically disappeared after being displayed during a sufficient period of time so as to be captured in the image capturing device 2.

Here, for example, if the checkered projection position information transmitting pattern 311 is projected by the tiling projection which arranges two projectors 1 in a horizontal direction, dark parts of the checker (black part in FIG. 4) overlap bright parts (white in FIG. 4), the dark parts overlap other dark parts, or the bright parts overlap other bright parts such that color tone of the checker is changed and projected in the overlap region of the projection regions A and B. Here, if the image capturing device 2 captures the overlap region, a control unit 4, which will be described later, can detect the overlap region on the coordinate system, included in the image capturing device 2, and can detect the size of the overlap region or the like. If the corresponding coordinate system changes to a coordinate system of the liquid crystal light valve, the control unit 4 can determine a pixel which forms an image of the overlap region in the liquid crystal light valve. That is, it is easy to determine the coordinate system in the liquid crystal light valve with the projection position information transmitting pattern 311 and the projection position information transmitting pattern 311 indicates information such as the size of the coordinate system or the like.

On the other hand, the tiling number transmitting pattern 321 is displayed by ○ or • in this embodiment, the total number of tiling number transmitting patterns 321 indicates the total number of projectors 1 provided in the tiling projection, and the extended direction of the tiling number transmitting pattern 321 indicates extended directions of the projectors 1. Further, the tiling number transmitting pattern 321 displayed by • indicates the position of the corresponding projector 1 which projects the tiling number transmitting pattern 321. Accordingly, if ○ is located near •, it means that other projector 1 is arranged near the corresponding projector 1 and the positional relationship between the projectors can be known.

In FIG. 5, two projectors 1 perform the tiling projection in a horizontal direction. The left-side projector 1 projects the tiling number transmitting pattern 321 in FIG. 5. In the same manner, in FIG. 6, three projectors 1 perform the tiling projection in a horizontal direction. And the most left-side projector 1 projects the tiling number transmitting pattern 321 in FIG. 6.

The projection position of the tiling number transmitting pattern 321, for example, as shown in FIG. 2, is the outside of the overlap region between the projection regions A and B of the projectors 1 and is the inside of an overlap region of the image capturing regions A' and B'. Thereby, the image capturing device 2 of the projector 1A can capture the tiling number transmitting pattern 321 being projected by the projector 1B as well as the tiling number transmitting pattern 321 being projected by the projector 1A. The image capturing device 2 of the projector 1B can also capture the both tiling number transmitting patterns 321.

A control device 4 includes hardware and software which execute a computer with a capture information acquiring unit 41, a determining unit 42, a projection position information transmitting pattern display unit 43, a tiling number creating unit 44, a tiling number transmitting pattern display unit 45, a tiling number consistency determining unit 46, a process parameter creating unit 47, a display information acquiring unit 48, and a display control unit 49. The software is the program for controlling the projector according to the invention. In addition, a transmission image display unit according to the invention includes the projection position information transmitting pattern display unit 43 and the tiling number transmitting pattern display unit 45. Each of the units 41 to 49 will be described in detail later.

An optical unit 5 includes a light source lamp unit 51 composed of vapor emitting source such as a metal halide lamp, a halogen lamp, a high-pressure mercury vapor lamp, or the like, an optical system 52 composed of an integrated illumination optical system, a color separating optical system, a relay optical system, or the like, and a liquid crystal panel 53 composed of a liquid crystal light valve serving as a light modulation element. In addition, the optical modulation element may be included in a transmissive liquid crystal panel, a reflective liquid crystal panel, or DMD (digital micro mirror device). The configuration of the optical system 52 is properly changed according to a kind of the optical modulation element, but is not limited to the above-described configuration. These configurations of the optical system 52 are used for typical projectors and the detailed descriptions will be omitted.

A projection lens 6 projects an optical image emitted from the optical unit 5 onto the screen 100. The projection lens 6 includes an known auto-focus equipment, an auto-zoom equipment, or the like as well as a lens shifting equipment (not shown) so as to control the projection positions in the projection regions A and B.

Details of Control Unit

Hereinafter, the control unit 4 will be described in detail.

The capture information acquiring unit 41 of the control unit 4 acquires the capture information from the image capturing device 2 and outputs the acquired capture information to the determining unit 42.

The determining unit 42 includes an image determining unit 421 which determines whether or not another image other than the image being projected by the projector 1 has been captured on the basis of the capture information, a transmission pattern determining unit (transmission image determining unit) 422 which determines whether or not the projection position information transmitting patterns 311 or the tiling number transmitting pattern 321 has been captured, and an overlap region determining unit 423 which determines the position or the size of the overlap region between the projection regions A and B or determines the difference of brightness (luminance) between the overlap region and a non-overlap region.

For example, when trying to perform the tiling projection by relatively accessing the projectors 1A and 1B in the stand-alone mode, the image capturing device 2 of the projector 1A simultaneously captures the entire image being projected by itself and a part of the image, which overlaps the capture region A', being projected by the projector 1B. There, the image determining unit 421 of the projector 1A determines whether or not the part of the image being projected by the projector 1B matches a part of the image being projected by the projector 1A by using an image processing method of matching pattern. Since the images being projected by the stand-alone mode are the same in the projectors 1A and 1B which try to perform the tiling projection and the images are completely synchronized, the image determining unit 421 determines that the image being projected by the projector 1B is the same with a part of the image being projected by the projector 1A. In a similar way, in the projector 1B, the image being projected by the projector 1A which overlaps the part of the capture region B' is determined that it is the same with the image being projected by the projector 1B.

The transmission pattern determining unit 422 compares the capture information inputted from the capture information acquiring unit 41 with the projection position information transmitting patterns 311 or a plurality of kinds of tiling number transmitting pattern 321 stored in the transmission pattern determining unit 422, and determines whether other projector which performs the tiling projection projected the transmitting patterns 311 and 321 by using the image processing method of matching the pattern. Further, the transmission pattern determining unit 422 determines how the tiling number transmitting pattern 321 tries to perform the tiling projection with reference to the number or position of ○ and •, and determines whether the projected number or position of ○ and • is proper or not.

The projection position information transmitting patterns 311 projected by each of the projectors 1A and 1B forms the overlap region in one side of each projection regions A and B and the overlap region determining unit 423 detects the position or size of the overlap region by capturing the overlap region with the image capturing device 2. In addition, the overlap region determining unit 423 also detects the image, excluded from the overlap region, of other projector 1. When the overlap region is formed and the projection images are being properly projected in the tiling mode, the projection images are projected and captured with the almost same brightness in the overlap region and the non-overlap region. However, when any of projection images disappears from the overlap region, in other words, there is only the projection image of the corresponding projector, and the left projection image is captured, the overlap region may be darker than the non-overlap region. It is possible to determine that other projection image is excluded and the tiling projection is released by detecting the difference of this brightness. Generally, the brightness is getting dark in a predetermined gradation along a right periphery if the overlap region exists in the right side of the projection region, or the brightness is getting dark in a predetermined gradation along a left periphery if the overlap region exists in the left side of the projection region.

The projection position information transmitting pattern display unit 43 calls the projection position information transmitting pattern 311 from the projection position information transmitting pattern storage unit 31 and outputs the projection position information transmitting pattern 311 to the display control unit 49 on the basis of the determination result of the determining unit 42. After that, the projection position information transmitting pattern display unit 43 projects and displays the projection position information transmitting pattern 311 on the screen 100. For example, if the image determining unit 421 of the projector 1A determines that there is the projector 1B which projects the same projection image with the projector 1A, the image determining unit 421 outputs and projects the projection position information transmitting pattern 311 from the projector 1A.

If the transmission pattern determining unit 422 detects the projection position information transmitting pattern 311 while the image capturing device 2 of the projector 1B captures the projection position information transmitting pattern 311, the projector 1B can recognize the projector 1A which is ready to perform the tiling projection. Contrary, since the projector 1B can recognize the projector 1A projecting the same projection image, if the projection position information transmitting pattern 311 being projected by the projector 1B is captured by the projector 1A and the transmission pattern determining unit 422 detects the projection position information transmitting pattern 311, the projector 1A can also recognize that the projector 1B is ready to perform the tiling projection.

The tiling number creating unit 44 creates a corresponding tiling number on the basis of the determination result of the determining unit 42. For example, in case that the projectors 1A and 1B recognize that the other party tries to perform the tiling projection, the overlap region determining unit 423 detects the overlap region of the projection position information transmitting pattern 311 and determines the direction of the other party based on the corresponding projector, and creates the tiling number according to the determination result. The tiling number creating unit 44 also creates the tiling number transmitting pattern 321 according to the tiling number. If the tiling number consistency determining unit 46, which will be described hereinafter, determines that the tiling number of the corresponding tiling number creating unit 44 is not proper, the tiling number creating unit 44 has a function to correct the wrong tiling number.

Figure 7:
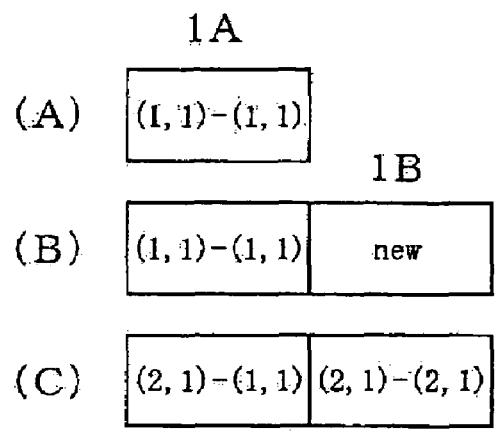
FIGS. 7A to 7C are views showing a process of creating the tiling number when a projector performing the projection in a stand-alone mode is added to another projector performing the projection in the stand-alone mode.

FIGS. 7A to 7C show a process of creating the tiling number when the projector 1B performing projection by the stand-alone mode is added to the projector 1A performing projection in the stand-alone mode.

At this time, the tiling number will be explained, for example, as (1, 1)-(1, 1). The number 1: means the number of projectors arranged in a horizontal direction and provided in the tiling projection, 1: means the number of projectors arranged in a vertical direction and provided in the tiling projection, 1: means a coordinate value in the horizontal direction when using a horizontal and vertical two-dimensional coordinate system which uses the number of projectors as the unit, and 1: means a coordinate value in the vertical direction when using the same coordinate system as above-described. Accordingly, the tiling number of the projector 1A in the stand-alone mode where the only one projector exists becomes (1, 1)-(1, 1) as shown in FIG. 7A.

FIG. 7B shows the case that the projector 1B is added to the projector 1A. The original tiling number of the projector 1B is (1, 1)-(1, 1) but, here, it is displayed as NEW for convenience of the explanation. If the projectors 1A and 1B recognize each other as a tiling projection party, the tiling number creating unit 44 of the projector 1A creates a tiling number (2, 1)-(1, 1) as shown in FIG. 7C and creates the tiling number transmitting pattern 321 of • and ○ described in FIG. 2. The projector 1B creates a tiling number (2, 1)-(2, 1) as shown in FIG. 7C and creates the tiling number transmitting pattern 321 of ○ and • as shown in FIG. 2.

Figure 8:
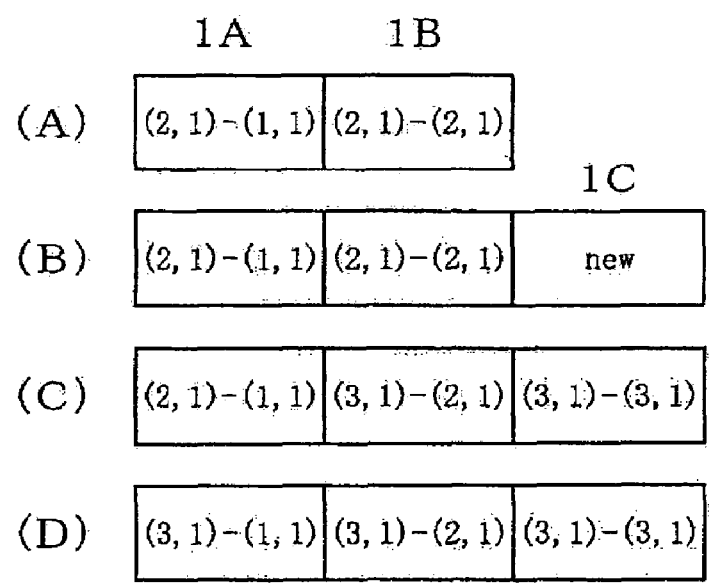
FIGS. 8A to 8D are views showing a process of creating the tiling number when a projector performing the projection in the stand-alone mode is added to a right side of two projectors performing the projection in a tiling mode.

As another embodiment, a projector 1C is arranged in right side of the projector 1B in FIGS. 8B to 8C in addition to the projectors 1A and 1B. That is, the tiling projection is performed by the three projectors 1A to 1C.

In this case, at the projectors 1A and 1B having corresponding tiling numbers as shown in FIG. 8A, the projector 1B firstly recognizes the projector 1C arranged as shown in FIG. 8B and changes its tiling number as shown in FIG. 8C. After that, the projector 1C recognizes the changed tiling number of the projector 1B (actually, the projector 1C captures the tiling number transmitting pattern 321 projected by the projector 1B) and changes the tiling number. At last, the projector 1A checks the change of the projector 1B in FIG. 8C and changes the tiling number for the consistency, as shown in FIG. 8D.

FIGS. 9A to 9D are views showing a process that the projector 1A is excluded from the left side of the projector 1B at the projectors 1A to 1C. That is, the tiling projection is performed by the two projectors 1B and 1C.

Figure 9:
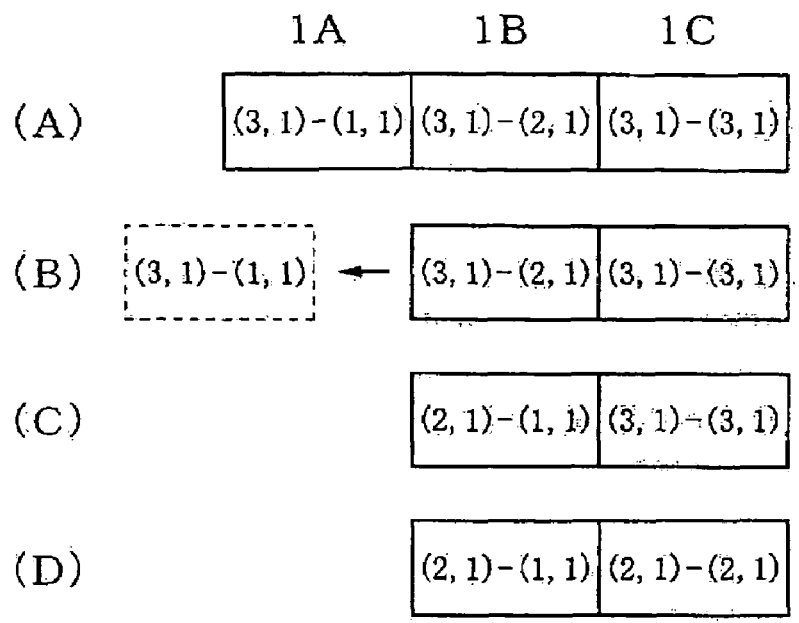
FIGS. 9A to 9D are views showing a process of creating the tiling number when excluding one projector from a left side of the three projectors performing the projection in the tiling mode.

In this case, among the projectors 1A to 1C as shown in FIG. 9A, the projector 1B recognizes the excluded projector 1A as shown in FIG. 9B and changes the tiling number as shown in FIG. 9C. The projector 1C, as shown in FIG. 9D, changes the tiling number by recognizing the changed tiling number of the projector 1B.

Figure 10:
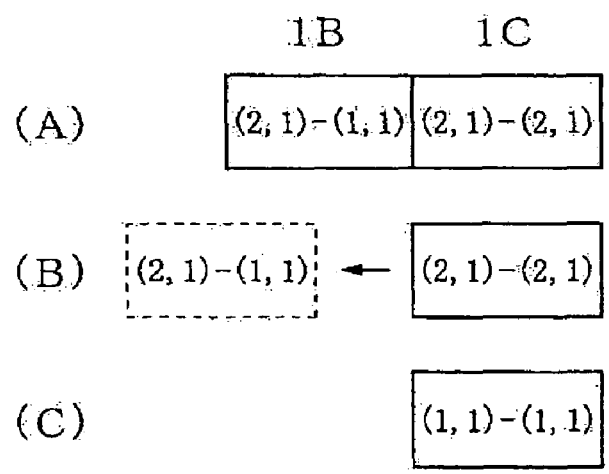
FIGS. 10A to 10C are views showing a process of creating the tiling number when performing the projection in the stand-alone mode by excluding one projector from the two projectors performing the projection in the tiling mode.

FIGS. 10A to 10C are views showing a process that the projector 1B is excluded from left side of the projector 1C at the projectors 1B and 1C performing the tiling projection. That is, the projector 1C performs the stand-alone projection.

In this case, at the projectors 1B and 1C having the corresponding tiling numbers as shown in FIG. 10A, the projector 1C recognizes the excluded projector 1B as shown in FIG. 10B and changes its tiling number as shown in FIG. 10C.

Returning to FIG. 3, the tiling number transmitting pattern display unit 45 projects and displays corresponding tiling number transmitting pattern 321 on the screen 100 by calling the tiling number transmitting pattern 321 stored in the tiling number transmitting pattern 32 and outputting the tiling number transmitting pattern 321 to the display control unit 49 or outputting the tiling number transmitting pattern 321 created by the tiling number creating unit 44 to the display control unit 49 based on the determination result of the determining unit 42.

The tiling number consistency determining unit 46 compares the tiling number transmitting pattern 321 of the other party with its captured tiling number transmitting pattern 321 and determines the consistency.

The process parameter creating unit 47 creates a process parameter so as to process display information of content images being inputted to it and outputs the created process parameter to the display control unit 49 on the basis of the position or the size of the overlap region determined by the overlap region determining unit 423.

The display information acquiring unit 48 acquires display information of content images from a PC or an AV device and outputs the display information to the display control unit 49.

In the stand-alone mode, the display control unit 49 creates a driving signal for forming optical images and drives the liquid crystal panel 53 with the driving signal without possessing the display information from the display information acquiring unit 48. In the tiling mode, the display control unit 49 processes the display information from the display information acquiring unit 48 by using the process parameter, creates the driving signal on the basis of the processed display information, and drives the liquid crystal panel 53.

Explanation on Operations

Figure 11:
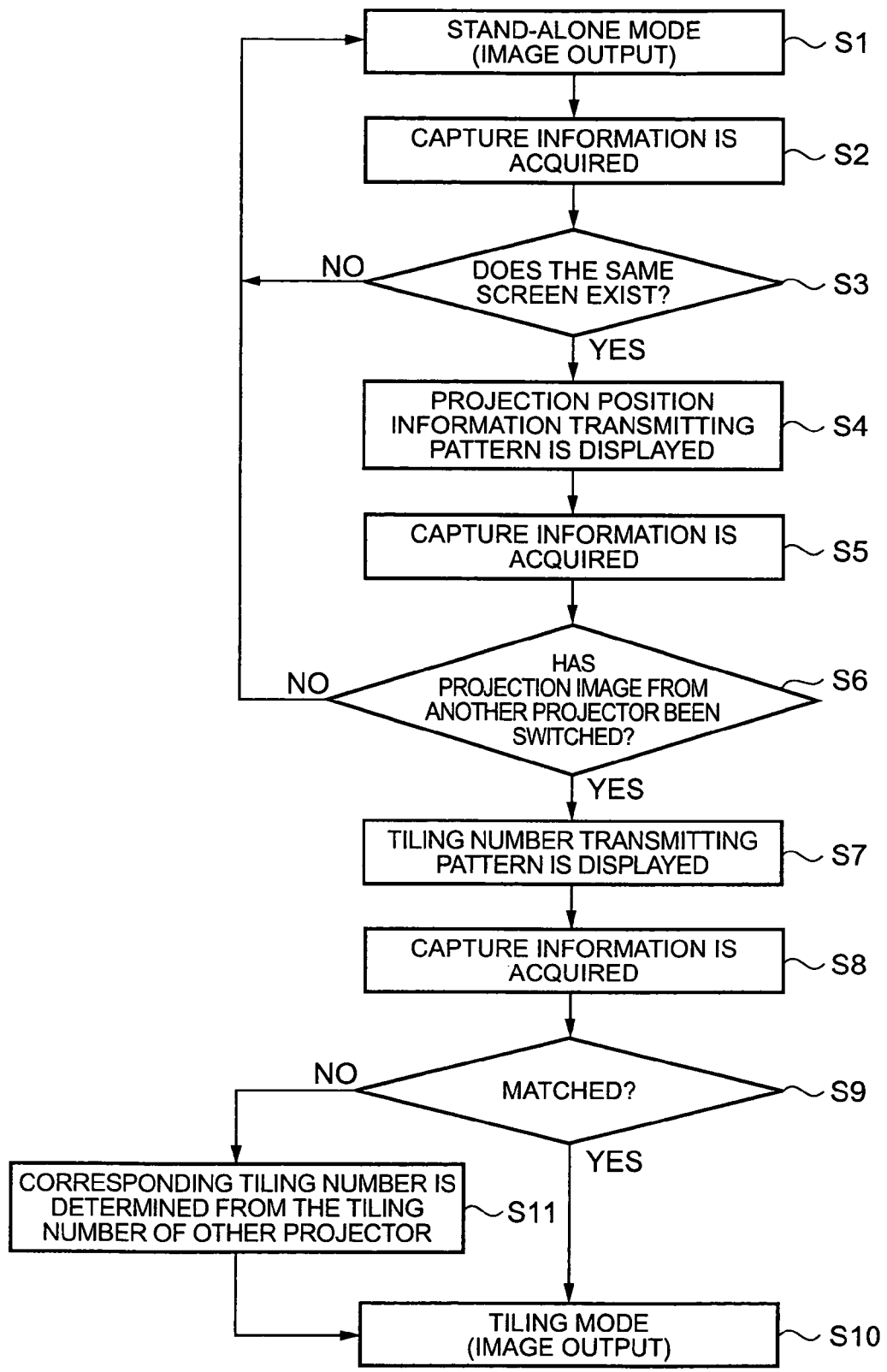
FIG. 11 is a flow chart showing operations being changed from the stand-alone mode to the tiling mode.

Hereinafter, operations for changing projection forms at the projector 1 with reference to the block diagram of FIG. 3, flow charts of FIGS. 11 and 13, and pattern diagrams of FIGS. 12A to 12E, 14A to 14E, 15A to 15D, and 16A to 16C. In addition, the operations from the stand-alone mode to the tiling mode (corresponding to FIGS. 7A to 7C) will be described with reference to FIGS. 11 and 12A to 12E. An operation in a case of maintaining the tiling mode while changing the number of projectors (corresponding to FIGS. 8A to 8D and 9A to 9D) will be described with reference to FIGS. 13, 14A to 14E, 15A to 15D, and 16A to 16C with an operation of changing the tiling mode to the stand-alone mode (corresponding to FIGS. 10A to 10C).

Step S11: In FIGS. 11 and 12A to 12E, the projectors 1A and 1B project images by the stand-alone mode, respectively. The images are projected by the same display information which is completely synchronized. In addition, the projection regions A and B are displayed by a white color in FIG. 12 because the content images are not shown. The capture devices 2 of the projectors 1A and 1B are capturing the image that the projectors 1A and 1B projected.

Step S2: The capture information acquiring unit 41 described in FIG. 3 acquires the capture information from the image capturing device 2 and outputs the capture information to the image determining unit 421 of the determining unit 42.

Step S3: The image determining units 421 of the projectors 1A and 1B monitors if an image, which is the same with the image being projected by one of the projectors 1A and 1B, gets close.

Figure 12A:
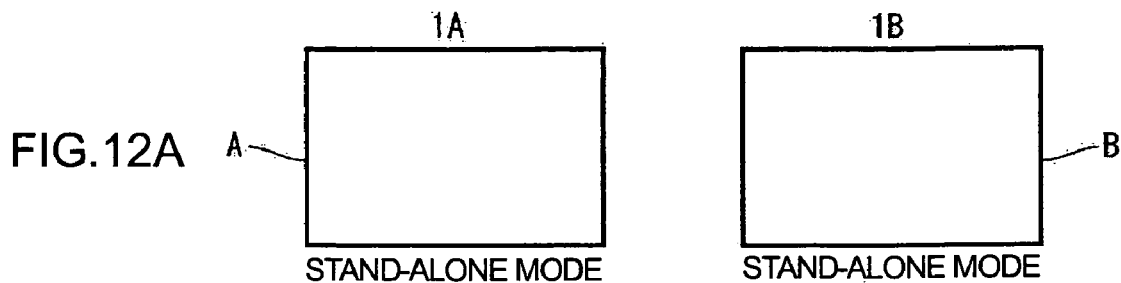
FIGS. 12A to 12E are views showing a projection image when the stand-alone mode is changed to the tiling mode.
Figure 12B:
Figure 12C:
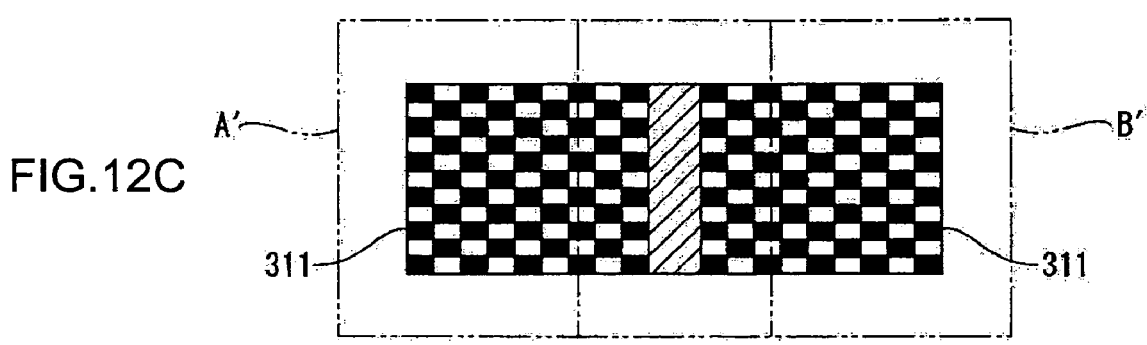

Step S4: As shown in FIG. 12B, if the image determining units 421 determine that the same image gets close, the projection position information transmitting pattern display units 43 of the projectors 1A and 1B project the projection position information transmitting pattern 311 on the screen 100 as shown in FIG. 12C. And, each of the projectors 1A and 1B is arranged in predetermined positions.

Step S5: The capture information acquiring unit 41 acquires the capture information from the image capturing device 2 and outputs the capture information to the transmission pattern determining unit 422 of the determining unit 42.

Step S6: The transmission pattern determining unit 422 determines whether the other party projects the projection position information transmitting pattern 311.

Figure 12D:
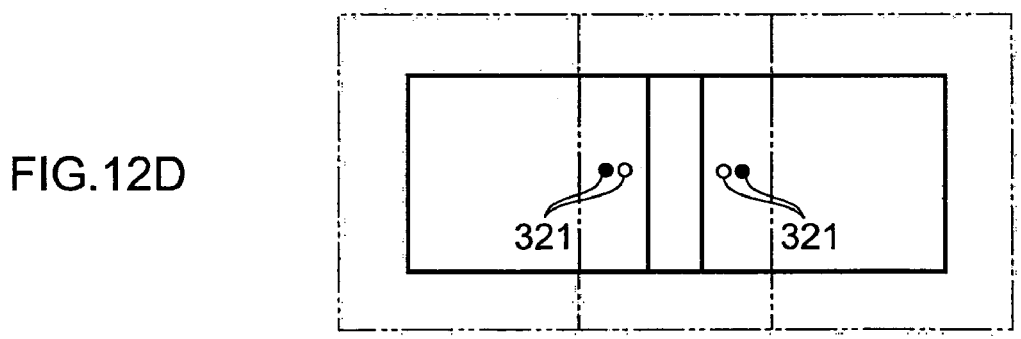

Step S7: If the transmission pattern determining unit 422 determines that the image being projected is changed to the projection position information transmitting pattern 311, the projectors 1A and 1B determine that the other party tries to project the image by the tiling mode and determines the position or the size of the overlap region indicated by hatching of the overlap region determining unit 423. On the basis of the determination result of the projectors 1A and 1B, the tiling number creating unit 44 changes the tiling number and creates the tiling number transmitting pattern 321. As shown in FIG. 12D, the tiling number transmitting pattern display unit 45 displays the tiling number transmitting pattern 321 and stores the tiling number transmitting pattern 321 in the tiling number transmitting pattern storage unit 32.

Step S8: The capture information acquiring unit 41 acquires the capture information from the image capturing device 2 and outputs the capture information to the transmission pattern determining unit 422.

Step S9: The transmission pattern determining unit 422 compares the tiling number transmitting pattern 321 projected by it with the tiling number transmitting pattern 321 projected by the other party so as to determine the consistency.

Figure 12E:
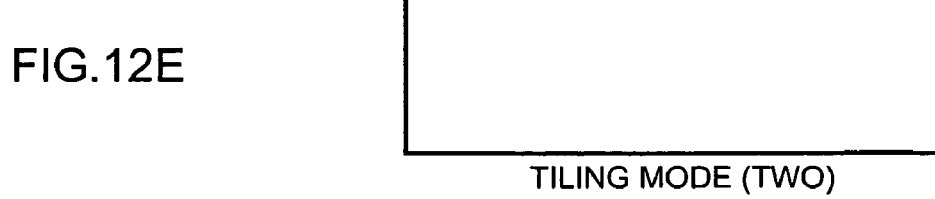

Step S10: If the transmission pattern determining unit 422 determines that the tiling number transmitting pattern 321 projected by it is the same with the tiling number transmitting pattern 321 projected by the other party, the process parameter creating unit 47 creates the process parameter according to the position or the size of the overlap region and outputs the process parameter to the display control unit 49. The display control unit 49 processes the display information for the content images on the basis of the process parameter and creates the driving signal. Accordingly, the tiling mode is started as shown in FIG. 12E.

Step S11: In addition, in step S9, if the transmission pattern determining unit 422 determines that the tiling number transmitting pattern 321 projected by it is not same with the tiling number transmitting pattern 321 projected by the other party, the transmission pattern determining unit 422 changes its tiling number by determining its tiling number from the tiling number transmitting pattern 321 of the other party.

Next, the operation that the tiling projection with two projectors is changed to the tiling projection with three projectors will be described. In addition, each of reference symbols C and C' in FIGS. 14A to 14C and 15A indicates the projection region and the capture region of the projector 1C, respectively.

Step S12: The projectors 1A and 1B project images by the tiling mode in FIGS. 13 and 14A. The projector 1C which projects the image by the stand-alone mode gets close to the projectors 1A and 1B. Each of the projectors 1A to 1C captures the image by using the image capturing device 2.

Step S13: Each of the capture information acquiring units 41 of the projectors 1A to 1C acquires the capture information from the image capturing device 2 and outputs the capture information to the image determining unit 421.

Step S14: The image determining units 421 of the projectors 1A to 1B determine if other image is projected in the capture regions A' and B' which should have no image.

Step S15: If the image determining units 421 recognizes the other image, the image determining units 421 outputs a release signal to the display control unit 49 so as to switch the projection mode to the stand-alone mode. When the projector 1C gets close to the projector 1B, the projector 1B switches the projection mode to the stand-alone mode so as to determine that the other image is added. The process parameter creating unit 47 of the projector 1B creates and projects the process parameter such that an image corresponding to the overlap region can become a black color (upper part where the amount of transmitted light decreases). This is for displaying an original image (having small luminance) of the projector 1A in a part corresponding to the overlap region.

Step S16: In the projector 1A, determined that there is no other image in step S14, the overlap region determining unit 423 compares the overlap region of the projector 1B with the non-overlap region. Since the image corresponding to the overlap region is determined that it is darker than the non-overlap region in the projector 1A performing the tiling projection, the projector 1A also switches the projection mode to the stand-alone mode by the release signal output to the display control unit 49.

Step S17: As the stand-alone mode as shown in FIG. 11, it is checked if there is the same screen. Here, the projector 1B determines that the image projected by the projector 1C and the image projected by the projector 1A (projecting the image by the stand-alone mode) in the tiling position are the same. Since the projector 1A projects the part of the image projected by the projector 1B, the projector 1A determines that there are the same images. Accordingly, the projectors 1A and 1B proceed to step S18.

Steps S18 and S19: The transmission pattern determining unit 422 of the projector 1B recognizes the projection position information transmitting pattern 311 projected by the projector 1C and projects the projection position information transmitting pattern 311 of it. The projector 1A also recognizes the projection position information transmitting pattern 311 projected by the projector 1B and projects the projection position information transmitting pattern 311. As the result, the projection position information transmitting patterns 311 projected by the projectors 1A to 1C are displayed on the screen 100 as shown in FIG. 14B.

Step S20: The projection position information transmitting patterns 311 are captured and the overlap region determining units 423 of the projectors 1A to 1C determine the positions or the sizes of the overlap regions, respectively.

Steps S21 and S22: Since the projector 1B recognizes that the projector 1C is added to the left side as well as the right side, the tiling number creating unit 44 changes the original tiling number so as to be correct and the tiling number transmitting pattern display unit 45 displays the correct tiling number transmitting pattern 321 as shown in FIG. 14C. In addition, the projector 1A recognizes the projection position transmitting pattern 311 of the projector 1B in step S18 and determines that a projector is added in the right side. Accordingly, the tiling number creating unit 44 of the projector 1A changes the tiling number to be correct. The tiling number transmitting pattern display unit 45 also displays the correct tiling number transmitting pattern 321 as shown in FIG. 14C. On the other hand, the projector 1C, as step S7 in FIG. 11, changes the tiling number and displays the tiling number transmitting pattern 321 of the ○ and • as shown in FIG. 14C. However, if it is not same with the projector 1B in step S9, the projector 1C changes the tiling number one more time in step S11 so as to be correct as shown in FIG. 14D. And then, the projectors 1A to 1C return to step S12 and start to project images by using a new projection type in the tiling mode as shown in FIG. 14E.

Hereinafter, a case of excluding the projector 1A from the state of the tiling projection by the three projectors 1A to 1C with reference to FIGS. 13 and 15A to 15D.

Figure 15A:
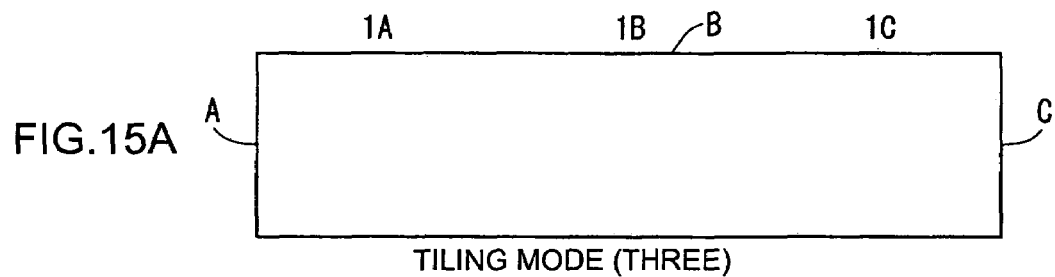
FIGS. 15A to 15D are views showing a projection image when the tiling mode with three projectors is changed to the tiling mode with two projectors.

Step S12 to S14: Even though the projector 1A is excluded from the tiling projection as shown in FIG. 15A, the projectors 1B and 1C determine No in step S14 and proceed to step S16 as shown in FIG. 15A.

Figure 15B:
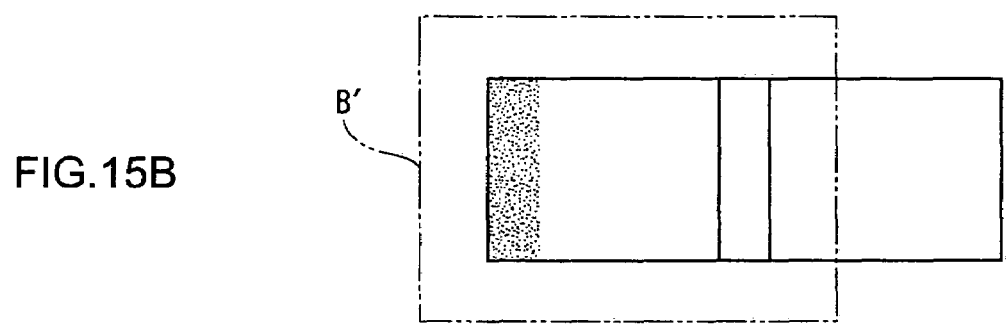

Step S16 and S15: The projector 1B determines that the left overlap region of the projection image is darker than the non-overlap region because the projector 1A is excluded as shown in FIG. 15B and proceeds to step S15 so as to change the projection mode to the stand-alone mode. At this time, the projector 1B projects the image such that the part of the image corresponding to the overlap region of the projector 1C is to become the black color. Accordingly, in step S16 the projector 1C determines that the overlap region of the projector 1B is darker than the non-overlap region (this is because the image corresponding to the overlap region is controlled by a small luminance) and switches the projection mode to the stand-alone mode.

Step S17 and S18: In step S17, since the each of the projectors 1B and 1C projects the image by the stand-alone mode, the projectors 1B and 1C determine that there are the same images in the tiling mode so as to project the images projected by the projectors 1B and 1C in the capture regions A' and B'. In step S18, any of projectors 1B or 1C does not project or recognize the projection position information transmitting pattern 311 in contrast to the case that a new projector is added, the process proceeds to step S21.

Figure 15C:

Step S21: The projector 1B recognizes that the left projector 1A is excluded by the determination in step S16, changes the tiling number to be correct, proceeds to step S22, and displays the tiling number transmitting pattern 321 as shown in FIG. 15C. On the other hand, the projector 1C also recognizes that the left projector is excluded by the determination in step S16, changes the tiling number to be correct, proceeds to step S22, and displays the tiling number transmitting pattern 321 as shown in FIG. 15C.

Figure 15D:
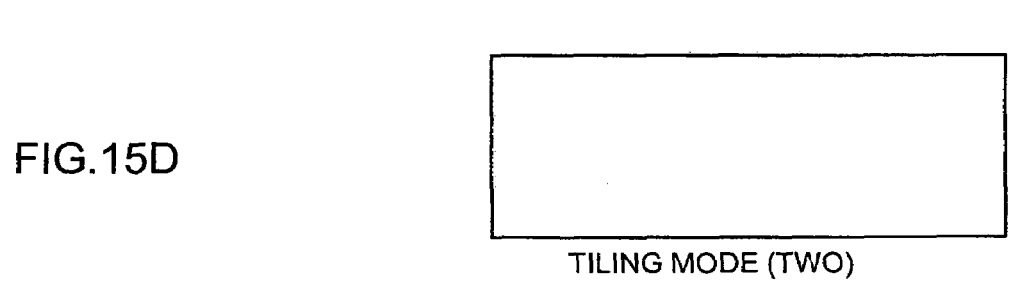

And then, the two projectors 1B and 1C return to step S12 and start to project the images by the tiling mode as shown in FIG. 15D.

Subsequently, a case in which the projector 1B is excluded from the two projectors 1B and 1C in the tiling projection will be described with reference to FIGS. 13 and 16A to 16C.

Figure 16A:
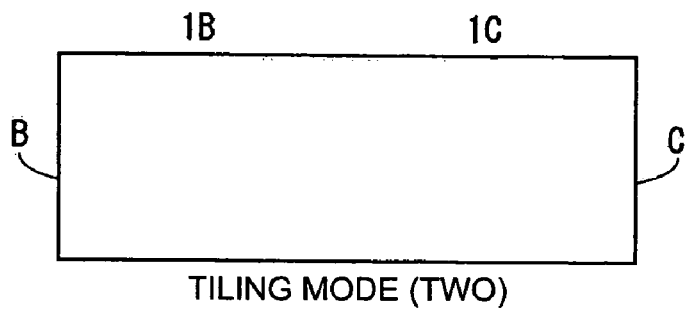
FIGS. 16A to 16C are views showing a projection image when the tiling mode is changed to the stand-alone mode.

Step S12 to S14: Even though the projector 1B is excluded from the state of tiling projection as shown in FIG. 16A, the projector 1C determines NO in step S14 and the process proceeds to step S16.

Figure 16B:
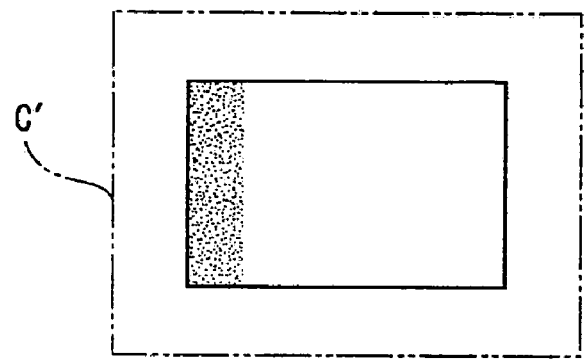

Steps S16 and S15: Here, since the projector 1B is excluded, the projector 1C recognizes that the left overlap region of itself is darker than the non-overlap region, the process proceeds to step S15, and the projection mode is switched to the stand-alone mode as shown in FIG. 16B.

Step 17: Here, there is only the projection image of the projector 1C on the screen 100, the process proceeds to step S23.

Step 23: The display control unit 49 determines that the projector 1C is switched to the stand-alone mode in step S15, and the process proceeds to step S24.

Figure 16C:
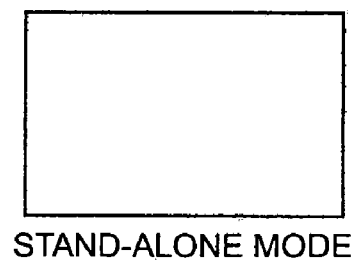

Steps 24 and 25: The projector 1C changes the tiling number thereof to the stand-alone mode and continues the stand-alone mode as shown in FIG. 16C.

Figure 13:
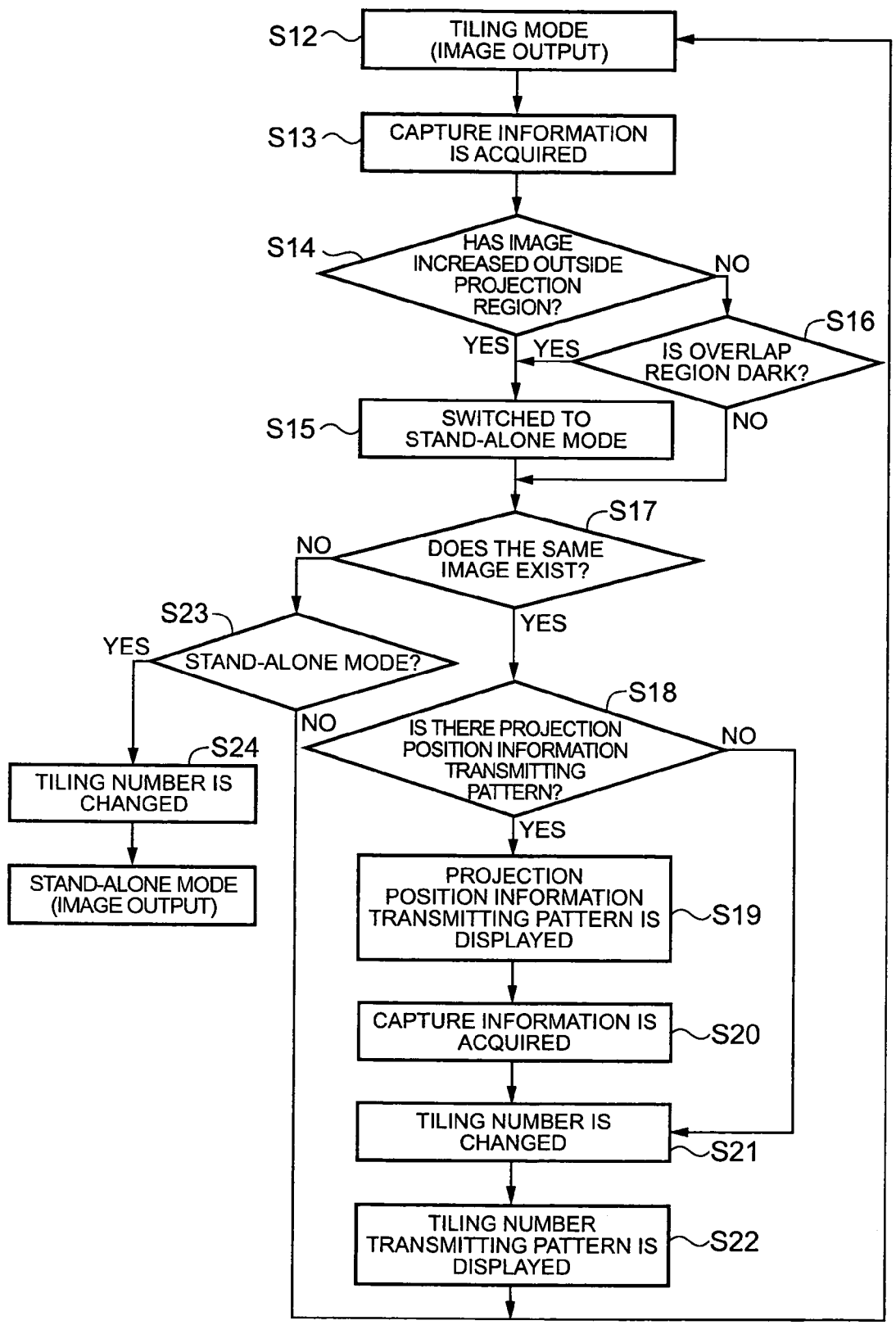
FIG. 13 is a flow chart showing operations being changed from the tiling mode to the stand-alone mode when the tiling mode is maintained while the number of projectors is changed.

In addition, when the content image is projected by the tiling mode in FIG. 13, the processes of step S12 to S14, S16, S17, S23, and S12 are repeated.

Effect of Embodiment

The above-described embodiment have the following effect.

(1) When the projector 1, which projects the image by the stand-alone mode or tiling mode, performs the tiling projection by adding a new projector 1, both closing projectors 1 display the projection position information transmitting pattern 311, capture the projection position information transmitting pattern 311 projected by the other party, and recognize that both projectors 1 try to perform the tiling projection. Accordingly, it does not need that a dedicated control unit according to the related art transmits information for performing the tiling projection and the tiling projection can be performed without the control unit. Further, it is possible to perform the tiling projection without troublesome when setting the tiling projection.

(2) The projection position information transmitting pattern 311 is not only for transmitting that the tiling projection is ready to perform but also for displaying the size of the coordinate system which uses the display image of the liquid crystal panel 53 as a unit. Accordingly, a display pixel which forms the image corresponding to the overlap region can be specified from the result by capturing the projection position information transmitting pattern 311. Further, the process parameter for controlling luminance of the overlap region can be accurately created.

(3) In addition, there is the tiling number transmitting pattern 321 as a transmission image. The projector can exactly recognize the correct arranged position by capturing the tiling number transmitting pattern 321 projected by other party so that the projector can correctly process the display information of the content image for the corresponding projection region of it.

(4) Since the projector 1 creates the process parameter for processing the display information on the basis of the information acquired from each transmitting patterns 311 and 321, the control unit according to the related art does not need and it is possible to construct a tiling projection system capable of being easily used.

(5) When adding a new projector 1 in the stand-alone mode to a plurality of projectors 1 which already perform the tiling projection, since the projectors 1 performing the tiling projection is switched to the stand-alone mode, it is possible to accurately determine that the closing projectors 1 are projecting the same image.

While the invention has been described with reference to the above-mentioned embodiments, the invention can be implemented in different forms without being limited to the above-described embodiment.

In the above-described embodiment, if the projector 1 projecting the image recognizes the same projection image being projected by other projector, the projector 1 displays the projection position information transmitting pattern 311 and the other projector 1 captures the projection position information transmitting pattern 311 so as to recognize that both projectors 1 can perform the tiling projection each other. However, the projectors 1 may recognize each other by displaying the tiling number transmitting pattern 321 instead of the projection position information transmitting pattern 311 and capturing the tiling number transmitting pattern 321 by the other party. In addition, not only the projection position information transmitting pattern 311 or the tiling number transmitting pattern 321, but also a dedicated transmission image capable of recognizing that each of the projectors can perform the tiling projection may be used. That is, since the dedicated transmission image is for making the projectors recognize each other, it does not need to indicate the coordinate system, the number of projectors to perform the tiling projection, or the position of the corresponding projector.

The transmission image related to the invention may be, for example, a pattern which combines the projection position information transmitting pattern 311 with the tiling number transmitting pattern 321, after all, one of the coordinate system, total number of the projectors, or a pattern indicating the arranged position of the corresponding projector.

In the above-described embodiment, when comparing the projection image of the corresponding projector with the image of the closing projector, only the capture information of the images captured by the image capturing device 2 are compared. However, as the closing projection image, not only the image information captured by the image capturing device 2 may be used but also the image information captured by the image capturing device 2 may be compared with the image information of the content image being projected by the corresponding projector. That is, the projector stores the image information of the content image being projected by the corresponding projector in a frame buffer as much as desired frames and determines whether the image information of the closing projection image (image information capable of being acquired by the image capturing device 2) exists in the image information stored in the frame buffer. Accordingly, even though other projector 1 is added while projection is performed in the tiling mode, it does not need to change the projection image in the side of performing the tiling projection as the size of the individual projection image. That is, it does not need to return to the size of the projection image to the same size of the closing projection image and it is possible to simply control the size of the projection image.

In above-described embodiment, the case that the projectors 1 are arranged in the horizontal direction is described as the type of the tiling projection. However, the invention can be applied to a case that the projectors 1 are arranged in the vertical direction. In addition, the projectors 1 can be added in the horizontal direction while the projectors 1 are performing the tiling projection in the vertical direction. FIGS. 17A to 17D are pattern diagrams showing the change of the tiling number in this case.

Figure 17:
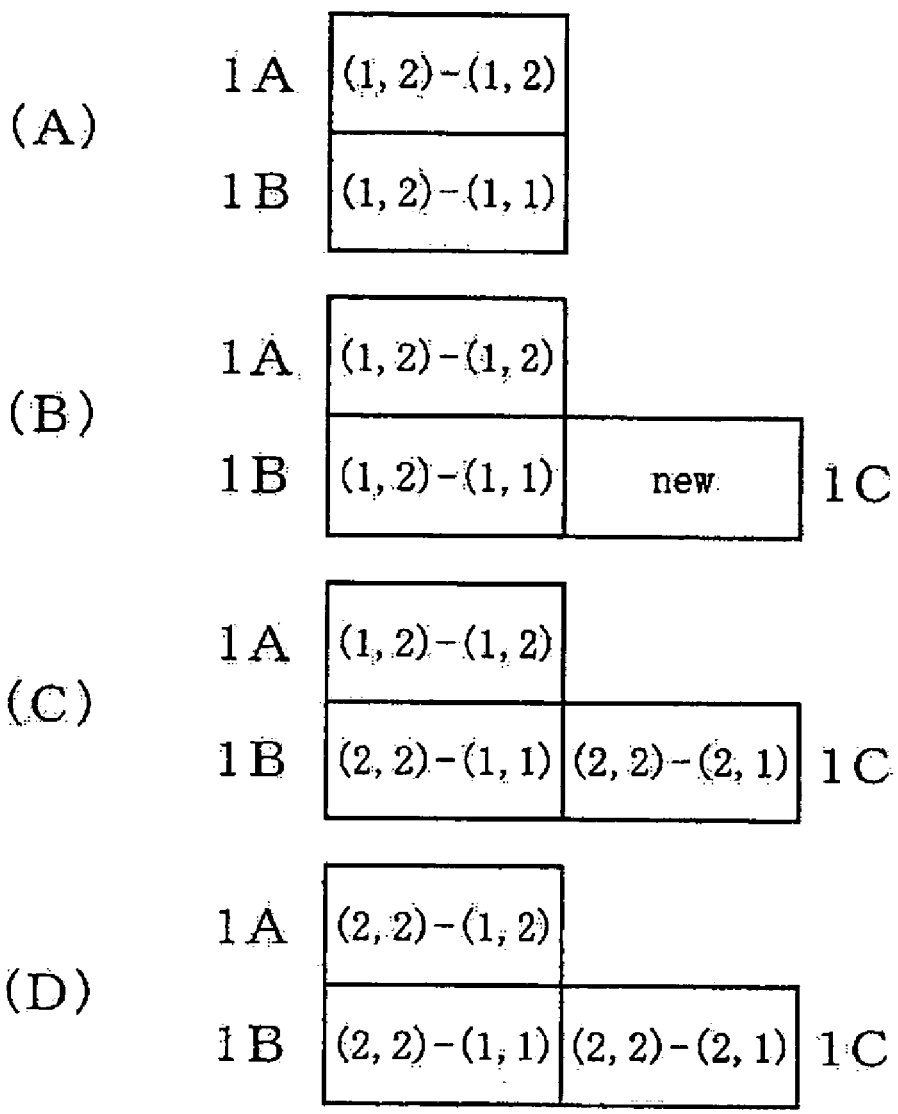
FIGS. 17A to 17D are views showing a process of creating the tiling number when projectors performing the projection in the stand-alone mode are added in right sides of two projectors being arranged in the vertical direction and performing the projection in the tiling mode as a modified embodiment of the invention.

In FIG. 17A, the projectors 1A and 1B arranged in up and down so as to perform the tiling projection. If the projector 1C, which performs the projection by the stand-alone mode, is arranged in right side of the projector 1B as shown in FIG. 17B, the tiling number of the projector 1B is correctly changed and the tiling number of the projector 1C, which noticed the change of the tiling number of the projector 1B, is changed as shown in FIG. 17C. At last, the tiling number of the projector 1A is changed as shown in FIG. 17D.

Figure 18:
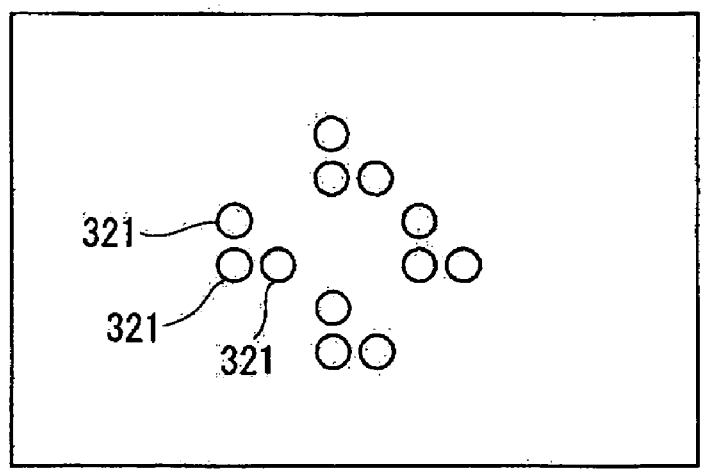
FIG. 18 is a view showing tiling number transmitting patterns used when performing the tiling projection with three projectors, which is a modification of the invention.
Figure 19:
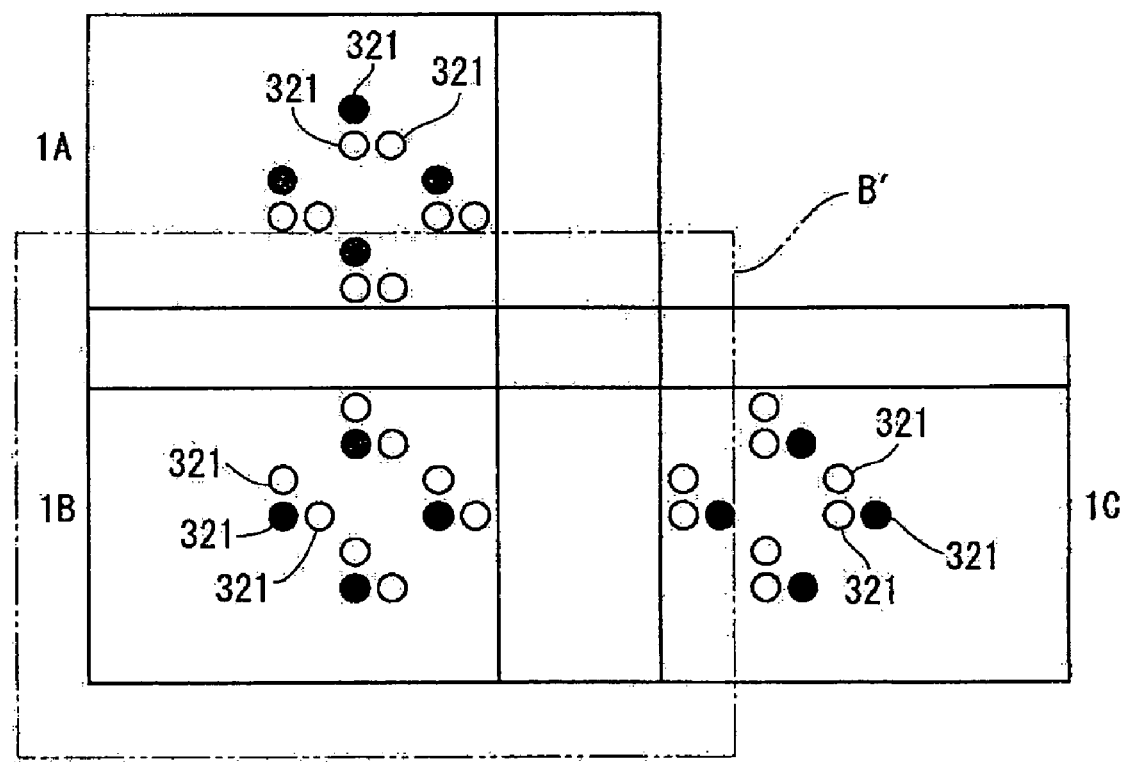
FIG. 19 is a view showing a state when the tiling number transmitting patterns shown in FIG. 18 are projected.

FIG. 18 shows the tiling number transmitting pattern 321 used when changing the tiling number in FIGS. 17A to 17D. As like this, the tiling number transmitting pattern 321 is arranged in the center of the projection region so as to correspond in quadrate. Accordingly, as shown in FIG. 19, for example, with the projector 1B, since the tiling number transmitting patterns 321 displayed by the projectors 1A and 1C exist in the capture region B' of the projector 1B, the projector 1B can capture the tiling number transmitting patterns 321 of the two projectors 1A and 1C as well as the tiling number transmitting pattern 321 projected by the projector 1B. It is the same in the projectors 1A and 1C.

Figure 20:
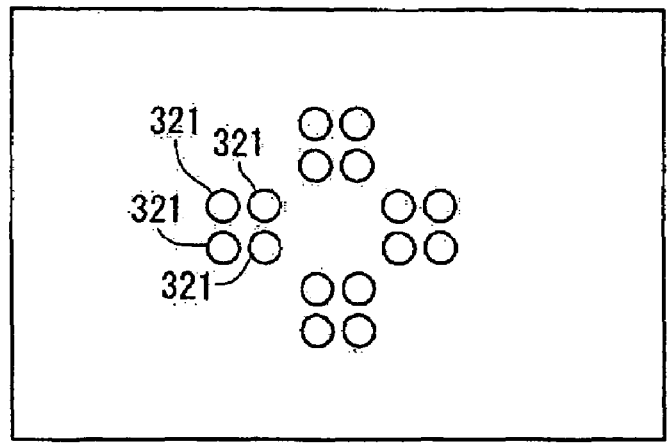
FIG. 20 is a view showing tiling number transmitting patterns used when performing the tiling projection with four projectors, which is a modification of the invention.
Figure 21:
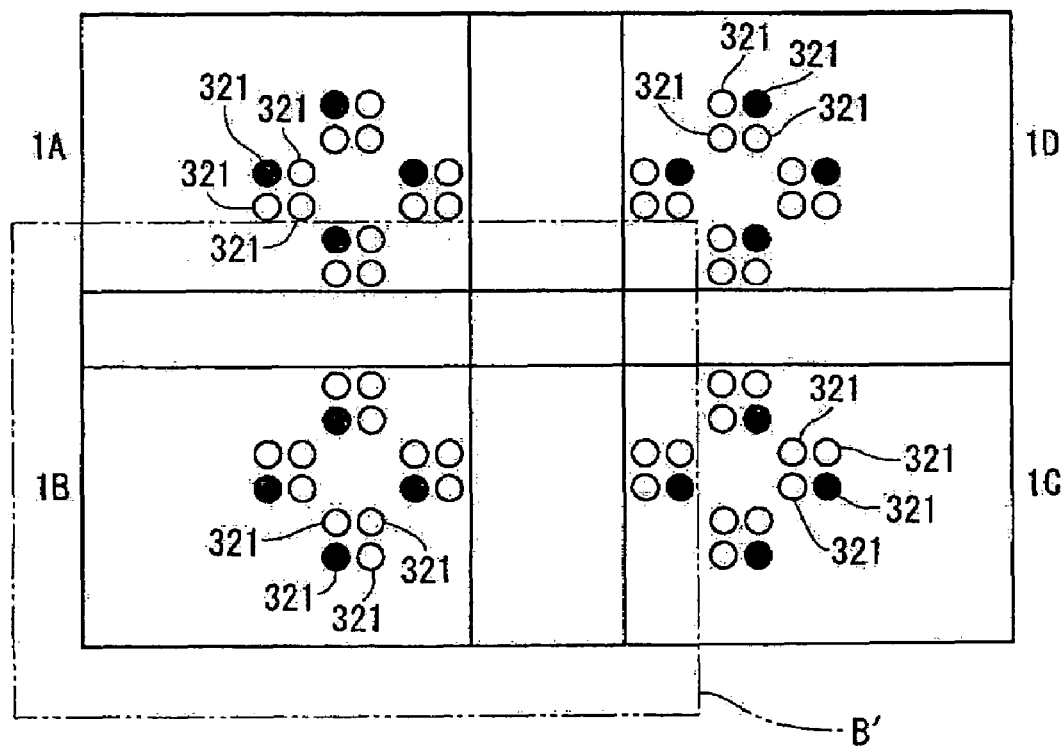
FIG. 21 is a view showing a state when the tiling number transmitting patterns shown in FIG. 20 are projected.

FIGS. 20 and 21 show the tiling number transmitting pattern 321 in a case of the tiling projection by using the projectors 1A to 1D of which two projectors are arranged in the horizontal direction and other two projectors are arranged in the vertical direction. As apparently shown in FIGS. 20 and 21, for example, even though the tiling number transmitting pattern 321 displayed by the projector 1D is not included in the projection region B' of the projector 1B, there is no problem because the projectors can exchange the information with other projectors arranged in horizontal or vertical direction without exchanging the information among the diagonally arranged projectors 1A to 1D and. In addition, the projector can recognize that the total number of projectors is four including itself • with three ○, which indicate other projectors 1, arranged in predetermined positions and the projector can recognize the position of it. Accordingly, it has no problem in creating the process parameter.

Figure 22:
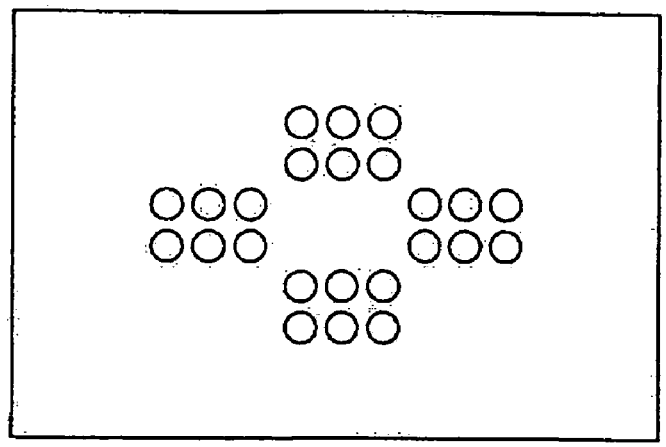
FIG. 22 is a view showing tiling number transmitting patterns used when performing the tiling projection with six projectors, which is a modification of the invention.
Figure 23:
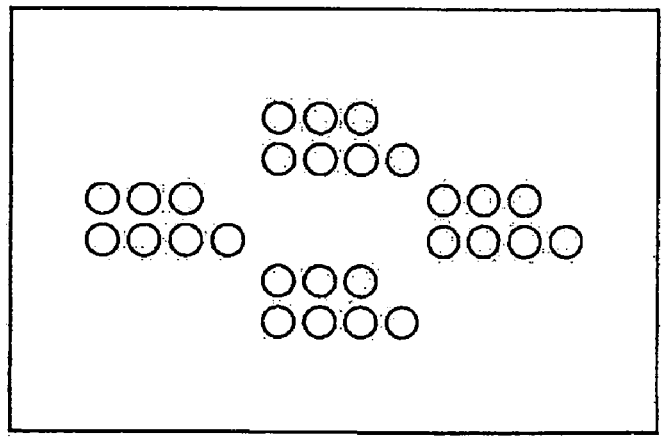
FIG. 23 is a view showing tiling number transmitting patterns used when performing the tiling projection with seven projectors, which is a modification of the invention.

As other example, FIG. 22 shows six tiling number transmitting patterns of which two are arranged in the vertical direction and three are arranged in the horizontal direction and FIG. 23 shows seven tiling number transmitting patterns of which two are arranged in the vertical direction, three are arranged in an upper horizontal direction and four are arranged in a lower horizontal direction. In addition, the reference number of the tiling number transmitting pattern is omitted.

Figure 24:
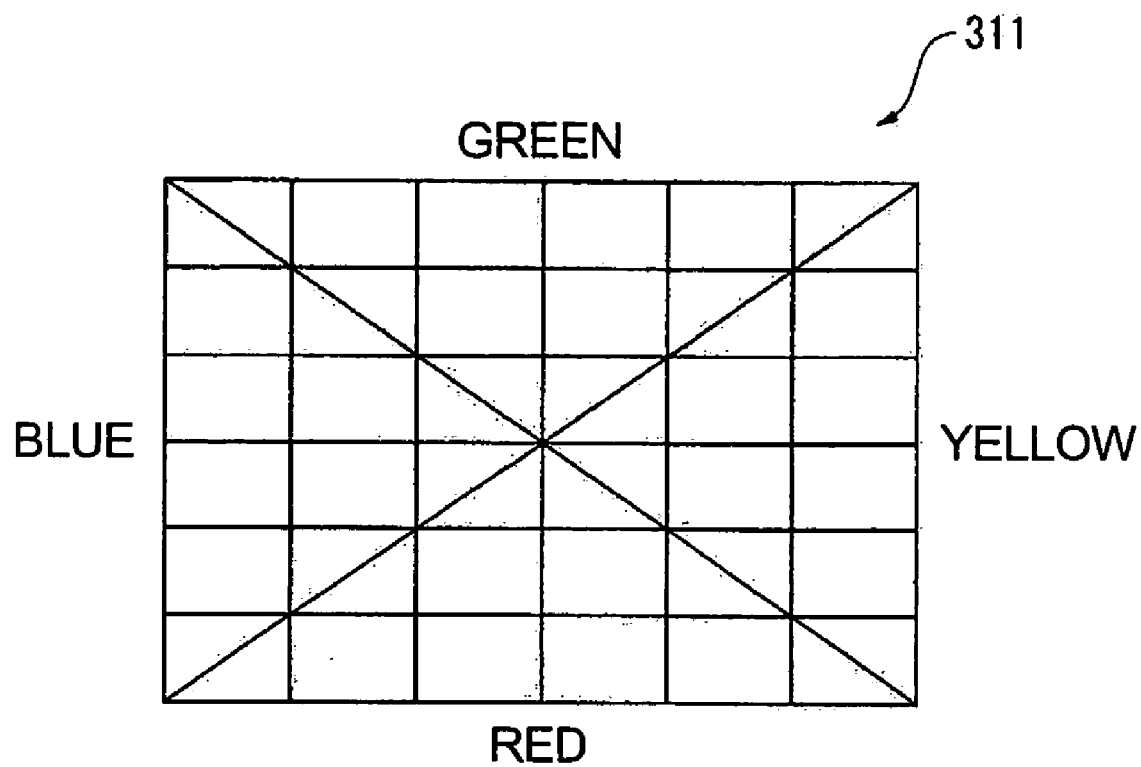
FIG. 24 is a view showing a projection position information transmitting pattern, which is a modification of the invention.

FIG. 24 shows an example of the changed projection position information transmitting pattern 311. Each of the regions divided by crossing diagonal lines at the projection position information transmitting pattern 311 are displayed with four colors (red, green, blue, and yellow). In this like configuration, if the same projection position information transmitting patterns 311 of the projectors 1 get close, color regions are overlapped regardless from the closing direction. Accordingly, another color region is created according to the overlap region such that the position or the size of the overlap region can be accurately determined. In addition, if the regions facing each other in the horizontal direction or in the vertical direction are displayed as complement colors, the overlap regions are brightly displayed such that the overlap region can be easily determined.

In addition, the configuration, the method, and the like for performing the invention have been described, but the invention is not limited to the above-described embodiments. In other words, the invention has been described with reference to the above-mentioned embodiments and drawings, but various modification actions for a form, the number, other specific configuration, or the like can be made to the respective embodiments without departing from the scope and sprit of the invention.

Accordingly, above-described form, number, or the like is for easily understanding the invention and does not limit the invention. That is, the material, construction, etc. in each of the embodiments are only illustrative, but can be properly changed. The description excepting for the limitation of a part of the form, the number, or the like is included in the invention.

The invention can be used to implement a large-sized home theater by combining the projectors at home as well as to perform various presentations by using the projectors.

The entire disclosure of Japanese Patent Application No. 2005-038732, filed Feb. 16, 2005 is expressly incorporated by reference herein.

What is claimed is:

1. A projector comprising:
   an image capture device that captures an image in a capture region larger than a projection region of a projection image;
   an image determining unit that compares and determines the projection image projected by the corresponding projector with another projection image projected in the capture region on the basis of capture information acquired from the image capture device;
   a transmission image display unit that projects and displays a transmission image indicating that the corresponding projector is ready to perform a tiling projection when the image determining unit determines that the projection image projected by the corresponding projector is the same as the another projection image;
   a transmission image determining unit that determines whether or not another projector projecting the another projection image has projected the transmission image; and
   a process parameter creating unit that creates a process parameter which processes display information of the projection image on the basis of a determination result of the transmission image determining unit.

2. The projector according to claim 1,
   wherein the transmission image indicates a coordinate system of the corresponding projector.

3. The projector according to claim 1,
   wherein the transmission image indicates whether or not there is any other adjacent projector.

4. The projector according to claim 1,
   wherein the transmission image indicates the total number of projectors provided for the tiling projection and the position of the corresponding projector among all of the projectors.

5. The projector according to claim 1, further comprising:
   an overlap region determining unit that compares the brightness of the projection image, of the corresponding projector, corresponding to an overlap region overlapping the projection image of the another projector and the brightness of the projection image corresponding to a non-overlap region.

6. A method of controlling a projector comprising:
   capturing an image in a capture region larger than a projection region of a projection image;
   comparing and determining the projection image projected by the corresponding projector with another projection image projected in the capture region on the basis of capture information acquired from an image capture device;
   projecting and displaying a transmission image indicating that the corresponding projector is ready to perform a tiling projection when it is determined that the projection image projected by the corresponding projector is the same as the another projection image;
   determining whether or not another projector projecting the another projection image has projected the transmission image; and
   creating a process parameter which processes display information of the projection image on the basis of a determination result.

7. A computer-readable storage medium having a program for controlling a projector recorded thereon, the program for controlling a projector having an image capture device capturing an image in a capture region larger than a projection region of a projection image, the program allowing a computer to function as:
   an image determining unit that compares and determines the projection image projected by the corresponding projector with another projection image projected in the capture region on the basis of capture information acquired from the image capture device;
   a transmission image display unit that projects and displays a transmission image indicating that the corresponding projector is ready to perform a tiling projection when the image determining unit determines that the projection image projected by the corresponding projector is the same as the another projection image;
   a transmission image determining unit that determines whether or not another projector projecting the another projection image has projected the transmission image; and
   a process parameter creating unit that creates a process parameter which processes display information of the projection image on the basis of a determination result of the transmission image determining unit.

* * * * *